United States Patent
Gogna et al.

(10) Patent No.: US 11,353,877 B2
(45) Date of Patent: Jun. 7, 2022

(54) BLOCKED REGION GUIDANCE

(71) Applicant: Zoox, Inc., Foster City, CA (US)

(72) Inventors: Ravi Gogna, San Jose, CA (US);
Meredith James Goldman, Redwood City, CA (US); Edward William O'Donnell, Palo Alto, CA (US); Frank Reinaldo Ramirez, San Francisco, CA (US); Dennis Schaefer, San Mateo, CA (US); Wenhao Sheng, Foster City, CA (US); Matthew Miller Young, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 115 days.

(21) Appl. No.: 16/716,411

(22) Filed: Dec. 16, 2019

(65) Prior Publication Data
US 2021/0181750 A1  Jun. 17, 2021

(51) Int. Cl.
*G05D 1/02* (2020.01)
*G06N 3/08* (2006.01)
*G05D 1/00* (2006.01)
*G08G 1/00* (2006.01)

(52) U.S. Cl.
CPC ......... *G05D 1/0214* (2013.01); *G05D 1/0088* (2013.01); *G05D 1/0221* (2013.01); *G05D 1/0291* (2013.01); *G06N 3/08* (2013.01); *G08G 1/22* (2013.01); *G05D 2201/0213* (2013.01)

(58) Field of Classification Search
CPC .. G05D 1/0214; G05D 1/0291; G05D 1/0221; G05D 1/0088; G05D 2201/0213; G06N 3/08; G06N 20/00; G08G 1/22; G08G 1/096811; G08G 1/207
See application file for complete search history.

(56) References Cited

U.S. PATENT DOCUMENTS

| | | | |
|---|---|---|---|
| 6,470,266 B1 * | 10/2002 | Ito | G01C 21/3626 340/990 |
| 2019/0080184 A1 | 3/2019 | Gerardo Castro et al. | |
| 2019/0155274 A1 * | 5/2019 | Lee | A63B 55/61 |
| 2019/0219410 A1 * | 7/2019 | Burgess | G08G 1/207 |
| 2019/0384320 A1 * | 12/2019 | Lee | H04L 9/0894 |

FOREIGN PATENT DOCUMENTS

| | | | | |
|---|---|---|---|---|
| JP | 2009069117 A | * | 4/2009 | |
| WO | WO2012115920 A2 | | 8/2012 | |
| WO | WO2017079349 A1 | | 5/2017 | |
| WO | WO-2017136283 A1 | * | 8/2017 | ....... G08G 1/096844 |

OTHER PUBLICATIONS

PCT Search Report and Written Opinion dated Mar. 12, 2021 for PCT Application No. PCT/US20/65125, 9 pages.

* cited by examiner

*Primary Examiner* — Rodney A Butler
(74) *Attorney, Agent, or Firm* — Lee & Hayes, P.C.

(57) ABSTRACT

Techniques to provide guidance to a vehicle operating in an environment may include determining a suggested region to block in the environment along a path of the vehicle and causing presentation of the suggested region to block in a user interface of the computer device. Information about the blocked region may be transmitted to one or more vehicles in the environment. Based on the information about the blocked region, at least one of the computer device or a vehicle computer system of the vehicle may control operation of the vehicle to avoid the blocked region.

20 Claims, 9 Drawing Sheets

BLOCKED REGION GUIDANCE

BACKGROUND

Planning systems in autonomous and semi-autonomous vehicles determine actions for a vehicle to take in an operating environment. Actions for a vehicle may be determined based in part on avoiding objects present in the environment. For example, an action may be generated to go around a double-parked vehicle, to change a lane to avoid another vehicle in the road, or the like. The planning systems may perform any number of operations (e.g., simulations, etc.) to determine an effect of each detected object on a potential action for the vehicle. However, in certain situations, the vehicle may request assistance to navigate past a portion of the environment that impedes progress of the vehicle.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
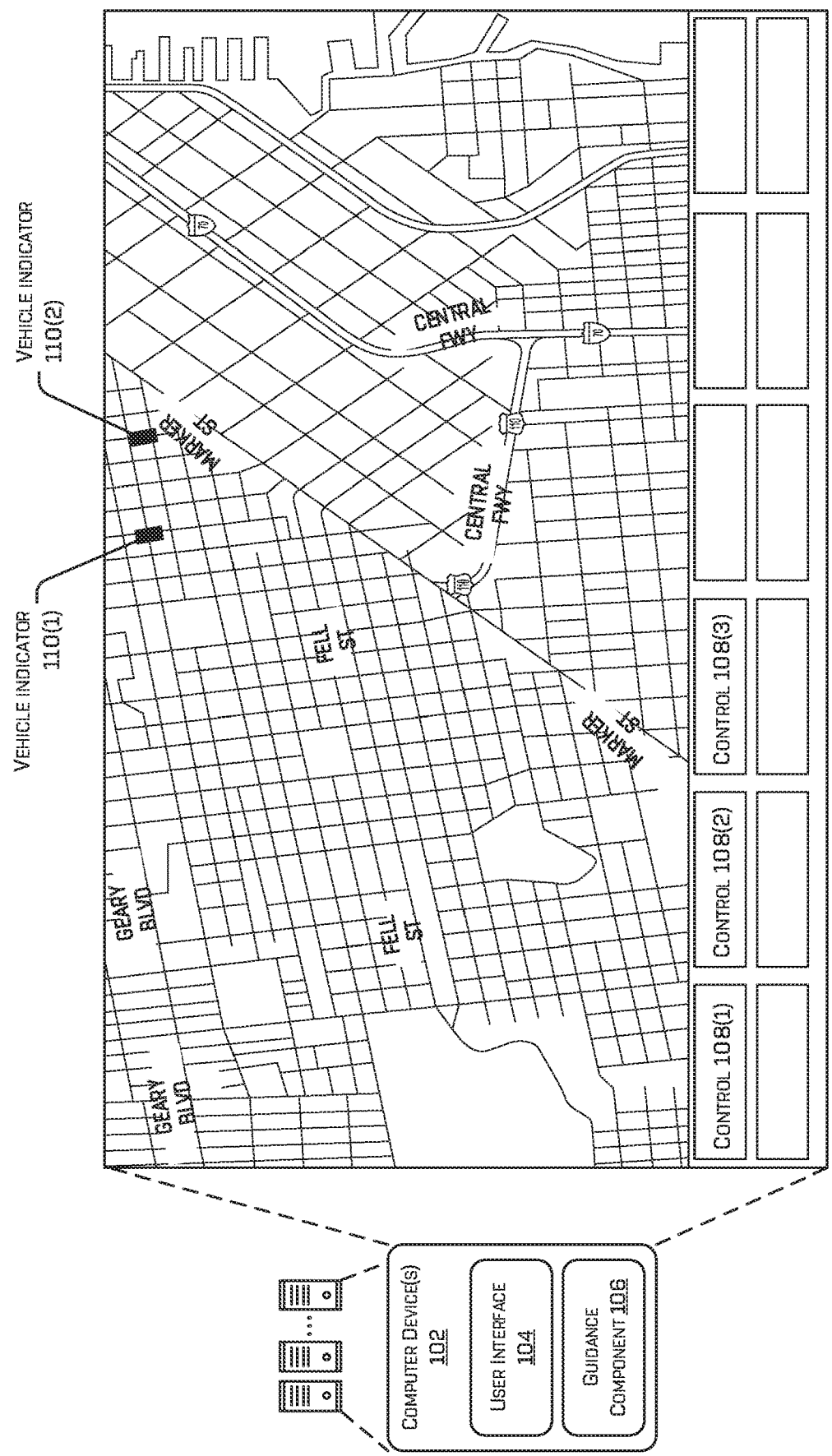
FIG. 1 is an illustration of an example user interface of a guidance component for providing guidance with respect to a blocked region showing an example representation of a vehicle traversing an environment.

As noted above, a vehicle may request assistance from a remote entity to navigate past an obstacle in an environment that impedes progress of the vehicle. Delays by the remote entity to provide the vehicle assistance may cause the vehicle to remain in place until the assistance is provided, which may delay progress of the vehicle, detract from an experience of a passenger of the vehicle, and may potentially impact the safety of the passenger.

This application describes techniques for providing guidance to a vehicle from a computer device remote from the vehicle. In some examples, a computer device of a teleoperations center may receive sensor data from a vehicle traversing an environment and determine a region in the environment that includes an obstruction that blocks a path of the vehicle. In various examples, the computer device may transmit an indication of the blocked region to the vehicle. A vehicle computer system of the vehicle may plan a new trajectory for the vehicle that avoids the blocked region (e.g., a blocked lane) based at least in part on receiving the indication of the blocked region from the computer device. In some examples, the computer device may transmit the indication of the blocked region to the vehicle based at least in part on receiving a request for assistance from the vehicle. However, in other examples, the computer device may transmit the indication of the blocked region to the vehicle before the vehicle encounters the blocked region by identifying that the vehicle is approaching the blocked region (e.g., without receiving a request for assistance from the vehicle). Using the techniques for providing guidance as described herein, a vehicle may receive blocked region guidance information from a computer device usable by the) vehicle to quickly and/or preemptively avoid blocked regions in the environment thereby improving safety of the vehicle.

In various examples, a user interface of a computer device presents controls to a human teleoperator or administrator that enable annotating one or more regions of an environment as blocked regions (impassable to the vehicle). The user interface may include one or more suggestions of regions to block. In some examples, an indication of the blocked region(s) (e.g., a blocked lane in a roadway, a construction zone in the roadway, a region beyond vehicle line-of-sight) may be transmitted from the computer device to the vehicle for use in guiding the vehicle safely past the blocked region. By outputting a user interface that provides suggested regions to block and enables selection or confirmation of a suggested region to block, the techniques described herein may reduce an amount of time taken to provide guidance to the vehicle relative to prior guidance techniques (e.g., manually designating an obstructed region, or entering a route for the vehicle around the blocked region). This improves vehicle safety by reducing an amount of time the vehicle may be waiting for assistance to go around the blocked region. Additionally, the techniques described herein may allow a teleoperator or administrator to monitor or support more vehicles than were possible using prior guidance techniques.

In some examples, the vehicle may comprise an autonomous or semi-autonomous vehicle with a vehicle computer system configured to request assistance from a computer device based on encountering a scenario that is difficult to navigate (e.g., in which a planner is unable to plan a route according to a set of driving policies, or otherwise). By way of example and not limitation, an autonomous vehicle may approach a vehicle that is blocking a lane in the road while parallel parking. In some situations, it may not be clear from the circumstances whether the vehicle is parallel parking, is double parked, or is broken down. In that case, the autonomous vehicle may request assistance to move past the blocking vehicle and may receive, based on the request, an indication of a lane or other region that is blocked (e.g., road segment identification, lane number, lane identification, start point of blocked region, length of blocked region, and so on). In some examples, the computer device may provide guidance by identifying an area that might not normally be available to the vehicle (e.g., an oncoming lane, bike lane, shoulder, etc.) that the vehicle can use to traverse the obstacle. However, in other examples, the computer device may provide guidance for one or more vehicles absent an explicit request from any one of the vehicles (e.g., without receiving a request for assistance).

In some examples, a user interface of the computer device may output a representation of a vehicle in the environment (a model, a simulation, an estimated state, and the like) based at least in part on sensor data received from the vehicle. For instance, the computer device may determine one or more suggested regions to block based at least in part on the sensor data of the vehicle and may present in the user interface the one or more suggested regions to block in relation to a position of the vehicle. In various examples, the vehicle may determine one or more suggested regions to block based at least in part on the sensor data indicating a blockage and communicate indications of the one or more suggested regions to block to the computer device. In some examples, the user interface of the computer device may be configured to receive a user input confirming one of the suggested regions as a blocked region. By outputting one or more suggested regions to block the teleoperator or other administrator may be able to quickly select or confirm a region to block from among the suggested regions to block and/or may quickly modify a suggested region to block, thereby providing guidance to the vehicle more quickly versus typical techniques that require a human to manually determine a region of an environment that is blocked, especially when an indication of the vehicle is still moving in the environment (in the case where the vehicle is still approaching an obstruction). Information about the blocked region, in various examples, may be communicated from the computer device to the vehicle based at least in part on the user input confirming the suggested region as the blocked region. In this way, the vehicle may be quickly provided with guidance indicating the blocked region when planning trajectories for the vehicle to follow. Further, by implementing the guidance techniques described herein, a vehicle can receive assistance (e.g., receive an indication of the blocked region usable to enable a planner of the vehicle to plan new paths that take into consideration the blocked region) despite the vehicle indicator changing position in the representation of the environment presented in the user interface.

In some examples, the vehicle may detect one or more objects and/or regions using one or more sensors while navigating in the environment. For instance, the objects may include static objects (e.g., buildings, bridges, signs, etc.) and dynamic objects such as other vehicles (e.g., cars, trucks, motorcycles, mopeds, etc.), pedestrians, bicyclists, or the like. In various examples, the vehicle may detect a region that is not a drivable surface (e.g., a large pot hole, a flooded roadway, a construction zone, etc.). In some examples, the object(s) and/or region(s) may be detected based on sensor data from sensors (e.g., cameras, motion detectors, lidar sensors, radar sensors, etc.) of the vehicle. As yet another example, the object(s) and/or region(s) may be detected based on sensor data received from remote sensors, such as, for example, sensors associated with another vehicle or sensors situated in the environment that are configured to share data with a plurality of vehicles. Sensor data representing the detected object(s) and/or region(s) may be communicated with a computer device (e.g., a teleoperations center for a fleet of autonomous vehicles). In various examples, the sensor data may represent the environment in which the vehicle operates including detected object(s) and/or region(s) that may impede vehicle progress. Accordingly, the computer device may output, based at least on the sensor data, one or more models representing the environment.

The computer device may, in some examples, determine a suggested region to block in the environment along a path of the vehicle based at least in part on the sensor data. In various examples, a user interface of the computer device may present the suggested region to block (e.g., a lane of a roadway, multiple lanes of the roadway, a portion of a lane of a roadway, etc.). By way of example and not limitation, in examples when the vehicle is approaching a stopped vehicle or other object in the road, the computer device may present the suggested region to block on a user interface showing a model that represents the environment.

In some examples, the computer device may receive user input confirming selection of the suggested region to block as a blocked region (e.g. a blocked lane). For instance, a remote operator (e.g., a teleoperator and/or a tactician trained to guide robots remotely) may select a control from the user interface to confirm the suggested region as the blocked region. In some examples, the remote operator may change (increase or decrease) a size of the region that is to become the blocked region (e.g., adjust a width and/or a length of the suggested region to block). In various examples, after the suggested region to block is selected by the remote operator, a visual representation on the user interface may be changed to reflect the region is now blocked (e.g., changes between a first representation for the suggested region to block when unselected to a second representation for the blocked region once selected/confirmed). In some examples, the second representation for the blocked region may be a different size (e.g., be longer, shorter, wider, narrower, etc.) than the first representation for the suggested region to block. For example, a start position for the blocked region may be adjusted based at least in part on a speed of the vehicle to cause the blocked region to appear in the user interface in front of the vehicle at a sufficient distance to allow the vehicle to plan for ways around the blocked region before stopping due to the blockage.

In some examples, receiving a user input confirming selection of the suggested region to block as the blocked region may cause an indication of the blocked region to be transmitted to the vehicle with no action needed by an operator of the computer device. In this way, the computer device may transmit an indication of the blocked region to the vehicle without further user input. In various examples, receiving the user input confirming selection of the suggested region to block as the blocked region may cause the indication of the blocked region to be transmitted to another vehicle of a fleet of autonomous vehicles. The blocked region may, in some examples, be stored in a map that is made available to the fleet of autonomous vehicles.

In some examples, the computer device may receive a request for assistance from the vehicle and determine a suggested region to block in an environment based at least in part on the request for assistance from the vehicle. However, in other examples, the suggested region to block may be determined independent of receiving a request for assistance from the vehicle. For example, the computer device may determine suggested region(s) to block in the environment and/or transmit an indication of the blocked region to one or more vehicles proactively to improve safety for the one or more vehicles operating in a vicinity of the blocked region. In some examples, the indication of the blocked region may be used by a planning component of a vehicle computer system to improve how the vehicle navigates (avoids and/or interacts with objects) in the environment.

In various examples, multiple regions may be blocked substantially simultaneously and/or successively via the user interface to provide a vehicle with multiple indications of multiple blocked regions to assist the vehicle. For instance, after a first region is blocked, the vehicle may navigate the environment while additional suggested regions to block are considered by a remote operator for blocking. In this way, the computer device may determine multiple blocked regions (multiple blocked lanes) and may transmit indications thereof to the vehicle (independent of whether the vehicle sends a request for assistance to the computer device).

In some examples, the computer device may provide instructions to the vehicle to explicitly guide the vehicle past a blocked region. For example, the computer device may determine a trajectory for the vehicle and provide the trajectory to the vehicle to cause the vehicle to avoid the blocked region. Additionally, or alternatively, the computer device may take authority of the vehicle to control the vehicle via the computer device and relinquish control upon successfully guiding the vehicle past a blocked region and/or after confirming guidance was received by the vehicle. However, and as mentioned above in other examples, an indication of the blocked region may be transmitted to the vehicle for use by a vehicle computer system to guide the vehicle past the blocked region.

A blocked region may be cleared or unblocked in a variety of ways. For instance, a teleoperator of the computer device may select a control that is configured to clear one or more blocked regions. In such examples, selection of the control may confirm to unblock a blocked region or multiple blocked regions. In other examples, a blocked region may be changed to an unblocked region based at least in part on the vehicle passing the blocked region. In still further examples, changing the blocked region to an unblocked region may be based on a global map usable by a fleet of autonomous vehicles being updated to remove the blocked region. In some examples, a vehicle in the fleet may make a recommendation (e.g., send a request to the computer device) to clear a blocked region, and the teleoperator may confirm unblocking the region using a control presented in a user interface of the computer device. In yet another example, a vehicle computer system of the vehicle may clear a blocked region and communicate the change to the computer device. In various examples, a blocked region may be change to an unblocked region based at least in part on a loss of network connection between the vehicle and the computer device remote from the vehicle.

The techniques discussed herein may improve a functioning of a computer device in several ways. Traditionally, remote assistance includes determining a new route for the vehicle to take to avoid the blocked region (in some cases a remote operator drawing a path on a user interface). However, it takes more time to determine the new route for the vehicle (draw the path) using traditional approaches than to block a region and share information about the blocked region with the vehicle. By outputting a user interface that enables suggested region(s) to be blocked, time to assist the vehicle is shortened versus traditional approaches in which a human operator draws a path for the vehicle to follow around the blocked region. This improves vehicle safety by reducing an amount of time the vehicle may otherwise be unable to navigate in the environment due to the blocked region.

The techniques discussed herein may also improve a functioning of a vehicle computing system by outputting an indication of one or more blocked regions. In some examples, the computer device may improve safety by sharing information about a blocked region with the vehicle while the vehicle is still moving in the environment. As a result, the vehicle computing system associated with the vehicle can control operation of the vehicle by utilizing planning considerations that identify the blocked region. By implementing the guidance techniques described herein, a vehicle can receive assistance in less time than typical approaches thereby causing the vehicle to navigate around blocked region(s).

The techniques described herein may be implemented in a number of ways. Example implementations are provided below with reference to the following figures. Although discussed in the context of an autonomous vehicle, the methods, apparatuses, and systems described herein may be applied to a variety of systems (e.g., a manually driven vehicle, a sensor system, or a robotic platform), and are not limited to autonomous vehicles. In another example, the techniques may be utilized in an aviation or nautical context, or in any system using machine vision (e.g., in a system using image data). The computer device may include a user interface through which one or more regions of the environment make be confirmed as a blocked region (e.g., a region and/or obstacle that prevents vehicle progress).

FIG. 1 is an illustration of an example user interface 104 of a guidance component for providing guidance with respect to a blocked lane showing an example representation of a vehicle traversing an environment. In general, the user interface 104 provides an overview of vehicles in an environment that may be guided (e.g., controlled and/or provided information) by a computer device to assist the vehicle during navigation of the environment.

As depicted in FIG. 1, one or more computer device(s) 102 comprises the user interface 104 and a guidance component 106. As shown in the example of FIG. 1, the user interface 104 comprises controls 108(1), 108(2), 108(3), and so on (collectively referred to as "controls 108") to invoke different functionality based on receiving a user input and vehicle indicators 110(1) and 110(2) to represent respective vehicles traversing in an environment. For instance, vehicle indicators 110(1) and 110(2) appear in the representation of the environment to indicate a position and/or movement by a respective vehicle. In some instances, a vehicle may send a request for assistance to the computer device 102 and the vehicle indicator 110(1) or 110(2) representing the vehicle will provide an indication of the request for assistance (e.g., by changing annotation or an appearance of the vehicle indicator or an associated control). In this way, a remote operator may, in some examples, provide guidance to the vehicle by selecting one of the controls 108 to cause the computer device 102 to initiate assistance (e.g., take control of the vehicle, output details for a vehicle, receive sensor data from the vehicle, etc.).

The computer device(s) 102 may be included in a teleoperations center that may provide remote assistance to one or more autonomous vehicles in a fleet. In some examples, the teleoperations center may provide guidance to the vehicle in response to a request for assistance from the vehicle. Additional details of determining when to contact a teleoperator as well as techniques for navigating the autonomous vehicle using instructions that are received from the teleoperator are described in U.S. patent application Ser. No. 16/457,289, filed Jun. 28, 2019, entitled "Techniques for Contacting a Teleoperator," which is incorporated herein by reference. Additional details of navigating the autonomous vehicle using instructions that are received from the teleoperator are further described in U.S. patent application Ser. No. 16/457,341, filed Jun. 28, 2019, entitled "Techniques for Navigating Vehicles using Teleoperations Instructions," which is incorporated herein by reference.

In various examples, the guidance component 106 may receive sensor data associated with the one or more of the vehicles in the environment. In general, the guidance component 106 may be configured to determine a suggested region to block and provide an indication of a blocked region based at least in part on a user input confirming selection of the suggested region to block. In some examples, the user interface 104 may be included as part of the guidance component 106 to provide guidance with respect to a blocked lane.

As noted above, the user interface 104 may comprise one of the controls 108 to invoke different functionality based on a user input. In some examples, one of the controls 108 may be associated with a vehicle in the environment that if selected, may cause details about the vehicle to appear in a new user interface, as discussed elsewhere including in FIG. 2 below. In still further examples, responsive to selection of one of the vehicle indicators 110(1) or 110(2), details about the vehicle may be presented in the new user interface. Generally, the controls 108 and/or the vehicle indicators 110(1) and 110(2) may provide a visual indication that a request for assistance has been received (e.g., the vehicle indicators may change color, flash, and the like). In some examples, the request for assistance may relate to a vehicle that approaches an obstacle (a blocked lane) and may be unable to navigate by the obstacle. In various examples, sensor data from the vehicle is provided to the computer device 102 as part of the request for assistance. In various examples, sensor data from one or more vehicles may be received by the computer device 102 periodically for the computer device 102 (of a teleoperations center, for example) to maintain, process, and/or output data related to rending the environment in the user interface 104.

In some examples, sensor data received by the computer device 102 may indicate that a vehicle is approaching a region causing congestion. In such examples, as associated vehicle indicator 110 may provide a visual indication that the vehicle is needing assistance without receiving a request for assistance from the vehicle.

Figure 2:
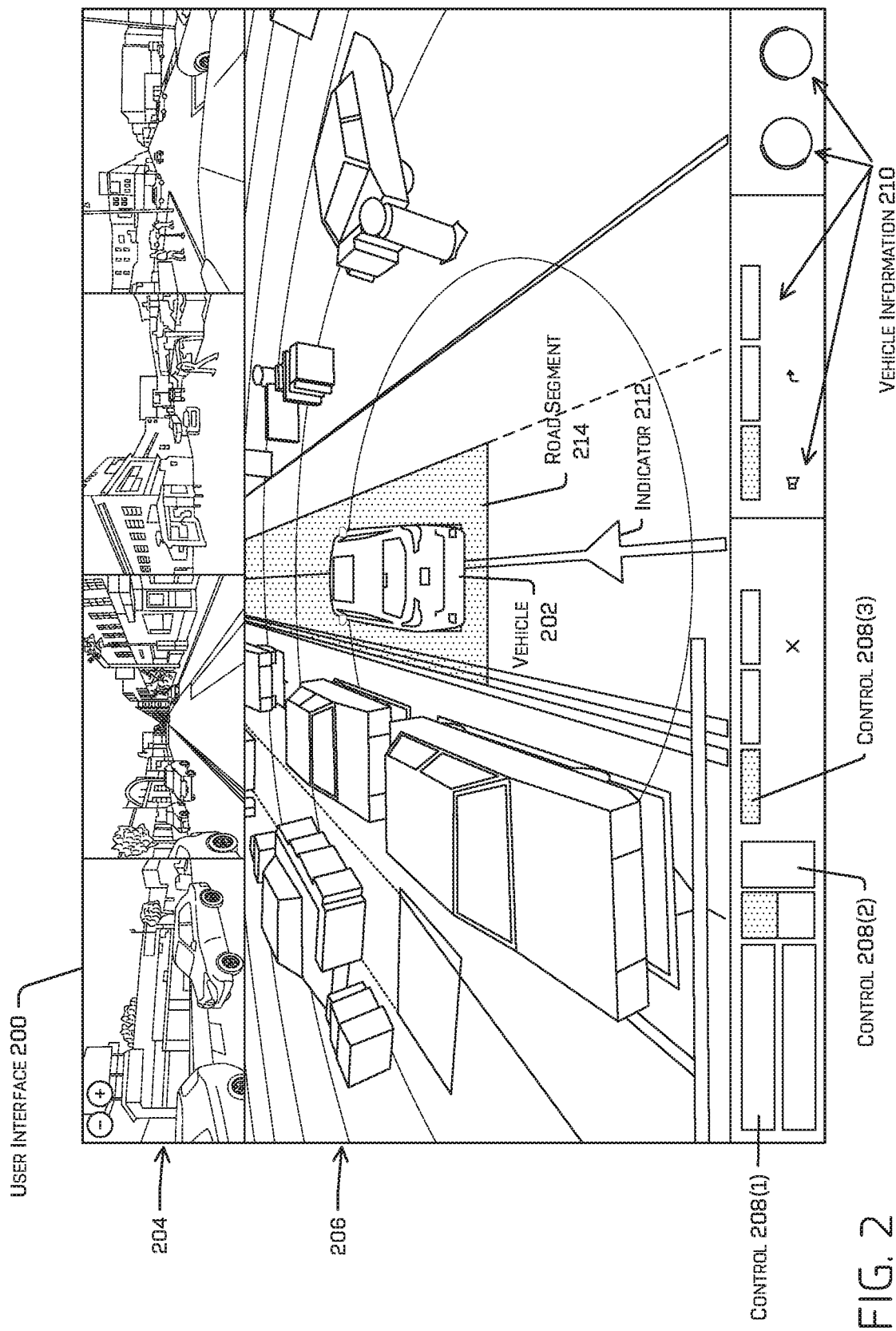
FIG. 2 is an illustration of another example user interface of a guidance component for providing guidance with respect to a blocked region showing an example representation of a vehicle traversing an example environment.

FIG. 2 is an illustration of another example user interface 200 of a guidance component for providing guidance with respect to a blocked region showing an example representation of a vehicle 202 traversing an example environment. In some examples, the user interface 200 may be presented based at least in part on receiving user input of one of the controls 108 of FIG. 1 to guide the vehicle 202.

In some examples, the user interface 200 may comprise a first portion 204 comprising one or more images based at least in part on sensor data associated with a sensor of the vehicle 202 and/or a second portion 206 comprising a model of the environment based at least in part on the sensor data associated with the sensor of the vehicle 202. As shown in FIG. 2, the user interface may further comprise controls 208(1), 208(2), 208(3), and so on (collectively referred to as "controls 202") for planning a path for the vehicle 202, taking control of the vehicle 202, and/or blocking a region of the environment, just to name a few. In some examples, the user interface 200 may also provide information 210 about the vehicle 202 (e.g., speed, direction of travel, steering angle, lighting, audio, and the like) and/or an indicator 212 showing a direction of travel for the lane or path. The user interface 200 is further illustrated as comprising a road segment 214 that represents a portion of the environment in which the vehicle 202 may travel to a destination. In some examples, the indicator 212 may represent a visual indication of the direction of travel for the vehicle 202 relative to the road segment 214 and/or a direction of travel of the lane.

In general, the first portion 204 and the second portion 206 of the user interface 200 may represent separate models of the environment in which the vehicle 202 may navigate. In some instances, a remote operator (e.g., a teleoperator and/or a tactician trained to guide robots remotely) associated with the computer device may use one or more of the models of the environment to identify a blockage that is upcoming in the current lane of the vehicle 202. By way of example and not limitation, the remote operator may control operations of the vehicle 202 including providing a path, route, trajectory, and so on to temporarily guide the vehicle 202. For example, the remote operator may control operations of the vehicle 202 based at least in part on a request for assistance from the vehicle 202 and may relinquish control of the vehicle 202 after guiding the vehicle 202 past the blocked region. Additional details of granting authority to an actor to provide guidance to an autonomous vehicle, transitioning the authority between actors, and tracking which actor has the authority are described in U.S. patent application Ser. No. 16/184,958, filed Nov. 8, 2018, entitled "Autonomous Vehicle Guidance Authority Framework," which is incorporated herein by reference.

As noted above, in some examples, the first portion 204 may comprise one or more images based at least in part on sensor data associated with a sensor of the vehicle 202. In such examples, the one or one or more images may represent scenes captured by a perception system of a vehicle computer system in the vehicle 202. As depicted in FIG. 2, multiple images may convey different scenes (front, back, right side, and left side) around the vehicle 202 including detected objects such as vehicles, pedestrians, bicyclists, and buildings just to name a few. In general, the first portion 204 of the user interface 200 includes images (still images and/or video) having sufficient quality to enable the remote operator to understand the surroundings of the vehicle 202. As shown in the first portion 204, controls (+,−) may be provided in the user interface 200 to zoom in and/or out of images in one or more of the different views in the first portion 204. In various examples, the remote operator may determine a context for interactions between the vehicle 202 and object(s) in the environment and/or between interactions among different objects. Additionally, or alternatively, the second portion 206 of the user interface 200 may comprise a model that shows the vehicle 202 interacting in the environment and may be associated with the one or more images in the first portion 204 of the user interface 200 (e.g., represent similar scenes). In some examples, sensor data from the vehicle 202 may continuously determine a location and/or orientation of the vehicle 202 within the environment (using a localization component of the vehicle, for example) and may also continuously detect objects. As shown in FIG. 2, the vehicle 202 may travel along the road segment 214 (e.g., a lane of a roadway) from a first location to a second location without encountering an obstacle that impedes progress. The road segment 214 may be associated with map feature data describing attributes of the road segment (e.g., a start point, an endpoint, road condition(s), a road segment identification, a lane number, and so on). Some or all of the attributes of the road segment 214 may be transmitted to the vehicle if the road segment 214 (or a portion thereof) becomes a blocked region. The road segment 214 may, in some examples, correspond to a corridor associated with a safety margin. For instance, the computer device may determine a drivable surface, determine a corridor, detect objects, and/or fuse the objects into the corridor. In such an example, a safety margin for the vehicle 202 is created during fusion of the detected objects into the corridor. Additional details of determining a corridor for an autonomous vehicle are described in U.S. patent application Ser. No. 15/982,694, filed May 17, 2018, entitled "Drive Envelope Determination," which is incorporated herein by reference. Additional details of determining a drivable area for an autonomous vehicle are described in U.S. patent application Ser. No. 16/181,164, filed Nov. 5, 2018, entitled "Vehicle Trajectory Modification For Following," which is incorporated herein by reference.

Figure 3:
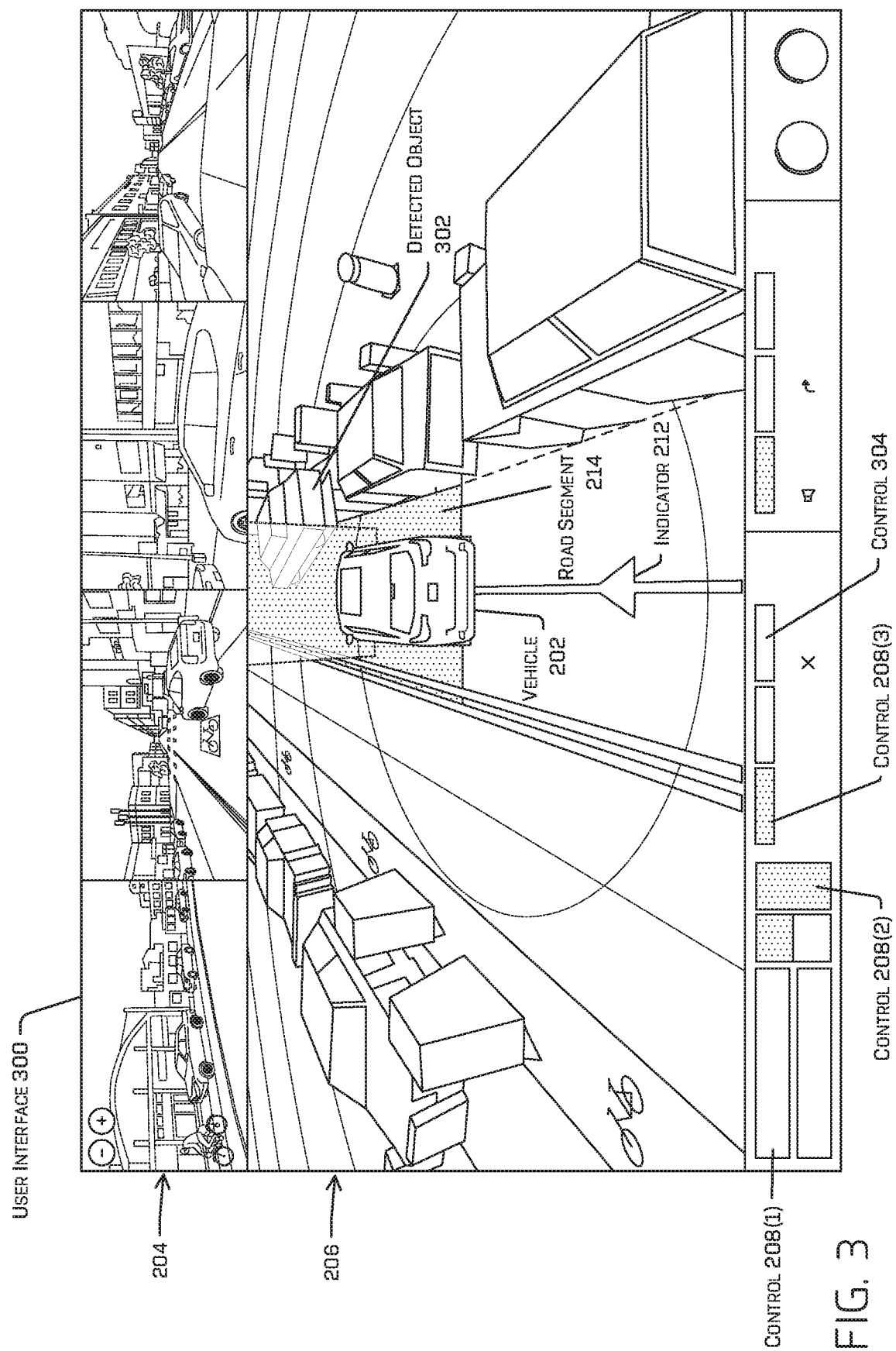
FIG. 3 is an illustration of yet another example user interface of a guidance component for providing guidance with respect to a blocked region showing an example representation of a vehicle traversing an example environment.

FIG. 3 is an illustration of yet another example user interface 300 of a guidance component for providing guidance with respect to a blocked region showing an example representation of the vehicle 202 of FIG. 2 traversing an example environment.

As depicted in the first portion 204 and the second portion 206 of the user interface 300, the vehicle 202 approaches a detected object 302 (another vehicle) that is at least partially blocking a lane in which the vehicle 202 is traveling. FIG. 3 further depicts example concentric regions around the vehicle to indicate a distance for objects relative to the vehicle 202. In some examples, the user interface 300 may provide control 304 to initiate blocking a region in the environment.

In some examples, the remote operator may select a control (e.g., control 208(2)) that causes the remote operator to take control of the vehicle 202 rather than the vehicle 202 being operated solely by the vehicle computer system. In such examples, the vehicle 202 may be controlled by the user interface 300 prior to a region in the environment being blocked by the user interface 300. For example, control 208(3) may build a path for the vehicle that controls steering, acceleration, braking, and so on to avoid the detected object 302. In one non-limiting example, one of the controls 208 may be used to plan a route for the vehicle based on images presented in the first portion 204 of the user interface 300 and/or based on the model of the environment in the second portion 206 of the user interface 300. Additional details of remotely providing incremental guidance to a vehicle operating in an environment that is difficult to navigate are described in U.S. patent application Ser. No. 16/457,646, filed on Jun. 28, 2019, entitled "Remote Vehicle Guidance," which is incorporated herein by reference. Further details of remotely providing incremental guidance to a vehicle operating in an environment that is difficult to navigate are described in U.S. patent application Ser. No. 16/457,654, filed on Jun. 28, 2019, entitled "Vehicle Control and Guidance," which is incorporated herein by reference. However, in other examples, the remote operator may provide assistance to cause the vehicle 202 to navigate around the blocked region without explicitly controlling the vehicle 202, such as causing the lane to be designated as a blocked lane as discussed in more detail below and elsewhere.

Figure 4:
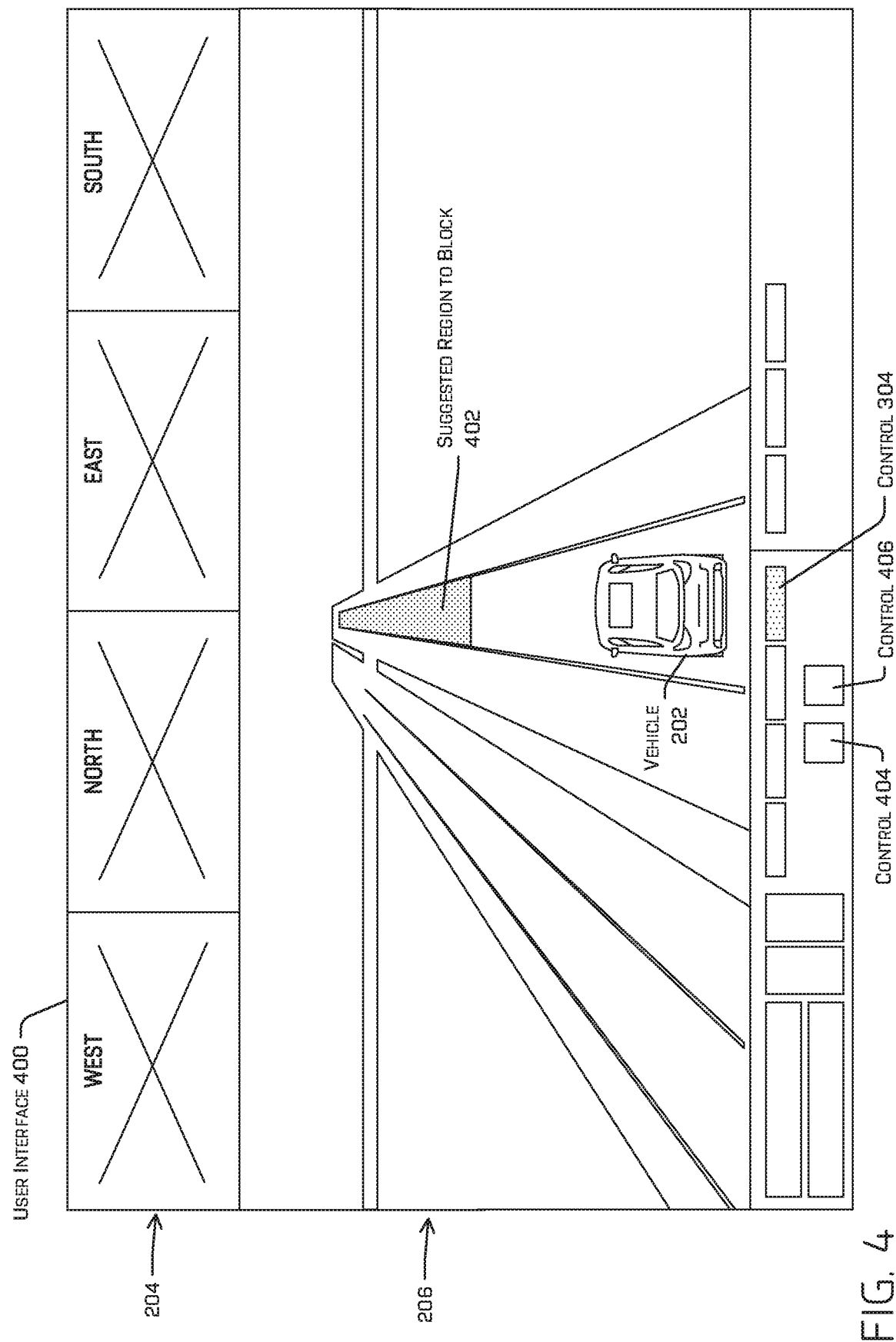
FIG. 4 is an illustration of the example user interface of FIG. 3 for implementing blocked region guidance techniques described herein.

FIG. 4 is an illustration of the example user interface 400 for implementing the blocked region guidance techniques described herein. The examples discussed in relation to FIG. 4, may be based at least in part on a vehicle approaching an obstacle while traversing an environment, such as the blocked region example described in FIG. 3. The user interface 400 omits detail from the first portion and second portion of the user interface for clarity.

As depicted in FIG. 4, the user interface 400 comprises a suggested region to block 402 in front of vehicle 202 of FIG. 2, and controls 404 and 406. While shown in FIG. 4 as being in front of the vehicle, in other examples, the suggested region to block 402 may be behind and/or to either side of the vehicle. In various examples, the control 404 may receive a user input confirming the suggested region to block 402 as the blocked region. The control 406 may, in some examples, be configured to receive a user input to clear a blocked region (unblock the region).

In some examples, the suggested region to block 402 may be determined by a computer device based at least in part on sensor data associated with the vehicle. For example, the computer device may determine a size of the suggested region to block 402 and/or a shape of the suggested region to block 402 for presentation based at least on a map storing features that represent the environment. The computer system associated with the user interface 400 may, in various examples, determine the suggested region to block 402 and optionally present the suggested region to block 402 in the user interface 300. In various examples, a computer device may present the suggested region to block 402 in the user interface 400 responsive to a selection of the control 404 indicating a request to block a region.

Additionally, or alternatively, the suggested region to block 402 may be determined by the vehicle based at least in part on sensor data associated with the vehicle. For example, the sensor data may indicate a blockage due to an object and/or an impassable region, and communicate an indication of the suggested region to block 402 to the computer device. In such examples, the teleoperator may confirm the suggested region to block 402 provided by the vehicle as the blocked region. In still further examples, a machine learned model of a computer device at the vehicle and/or at a teleoperations center may confirm the suggested region to block 402 as the blocked region (whether determined by the vehicle or by the computer device of the teleoperations center).

In various examples, the suggested region to block 402 may be determined based at least in part on a region associated with a road segment (road segment 214), a blocked lane in a roadway, a construction zone in the roadway, and/or a region beyond vehicle line-of-sight (e.g., due to a horizon). For instance, the computer system may determine the suggested region to block 402 as a lane extending from a current position of the vehicle 202 and/or the road segment 214 (a segment defined by map feature data). However, in other examples, the suggested region to block 402 may be determined by the computer device as a lane adjacent to the vehicle (e.g., a lane other than the lane in which the vehicle is travelling).

In some examples, a region may be presented as the suggested region to block 402 based at least in part on the region being an eligible region to block. For instance, a region may be an ineligible for blocking based on one or more factors (e.g., the region is too short, the region is not linked to other regions, the region is impassable, etc.). In some examples, a region ineligible for blocking may be presented with a visual indicator to reflect that it is not available for blocking (different from a suggested region to block. In other examples, a region ineligible for blocking and/or audio reminder(s) by may not be presented in the user interface 400. In still further examples, a visual indicator may be presented in the user interface 400 responsive to an attempt to block a region that is ineligible for blocking. For example, the user interface 400 may receive a user input of an ineligible region and, based on the user input being received, output a notification indicating that the region is ineligible for blocking.

In some examples, the suggested region to block 402 may be configured as a selectable region that, if selected (e.g., tapped) by a remote operator, confirms the suggested region to block 402 as a blocked region (as opposed to the controls 404 as noted above).

In some examples, a remote operator may adjust features (a start point, an endpoint, a length, a width, and so on) of the suggested region block 402. For instance, a remote operator may adjust a size of the suggested region to block and/or a shape of the suggested region to block in the user interface 400. In this way, the remote operator may identify features of the suggested region to block 402 that may be indeterminable by a vehicle computer system of the vehicle. By way of example and not limitation, a width a lane of a roadway may be widened to a portion of another lane (an adjacent lane and/or an opposing lane) to indicate portions of the other lane that should be blocked. In various examples, a size of a region to be blocked and/or a distance to a blocked region may be shortened and/or lengthened to adjust for changes in which portion of the lane is available/not available for traversing by the vehicle. For example, the size of a suggested region to block and/or a blocked region may be shortened to be less than a length associated with an identification for the lane (as specified by data associated with a map). In some examples, adjusting features of the suggested region to block 402 may be performed while the suggested region to block 402 is presented in the user interface and/or after the suggested region to block 402 is selected as the blocked region.

In various examples, a remote operator of the computer device may continue to select an additional suggested region(s) to block 402 prior to relinquishing control to the vehicle (in examples when the computer device takes control of the vehicle) and/or transmitting an indication of the blocked region(s) to the vehicle (in examples when the computer device provides preemptive assistance).

In some examples, the computer device may provide guidance by identifying an area that might not normally be available to the vehicle (e.g., an oncoming lane, bike lane, shoulder, etc.) that the vehicle can use to traverse the obstacle. In such examples, an indication of the available area may be provided to the vehicle as part of the indication of the blocked region(s). For instance, a bike lane or a portion of an opposing lane may be identified by a remote operator as passable and may be transmitted by the computer device to the vehicle for traversing the blocked region. Thus, a remote operator may override a policy associated with a road segment or lane (prohibiting access by the vehicle) to use an area not normally available to the vehicle.

In some examples, the user interface 400 may be configured to receive a user input from the control 406 to clear a blocked region (unblock the region). Additionally, or alternatively, the user interface 400 may be configured to receive a user input from the control 208(2) to relinquish control of the vehicle and clear one or more blocked regions determined during control by the computer device.

The user interface 400 may be configured to enable and disable the control 404 indicating a request to block a region based on a position of the vehicle. For example, when the vehicle 202 is in a lane that includes a blocked region up ahead, then the control 404 may be disabled because the region is already blocked. However, in some examples, the control 404 may be enabled when the vehicle changes lanes to an eligible lane for blocking. In some examples, a region (e.g., a lane of a roadway, a road segment, and the like) may be ineligible for blocking and attempts to block such an ineligible region may receive various visual and/or audio reminder(s) by the user interface 400.

As shown in FIG. 4, the user interface 400 presents a rear birds eye perspective. In other examples, the user interface 400 may present a top perspective or other perspective that improves a viewpoint for selecting the suggested region to block 402. In some examples, a rear birds eye perspective or a top perspective may be output for display in the user interface 400 responsive to a selection of the control 304 that initiates presentation of the user interface 400.

Figure 5:
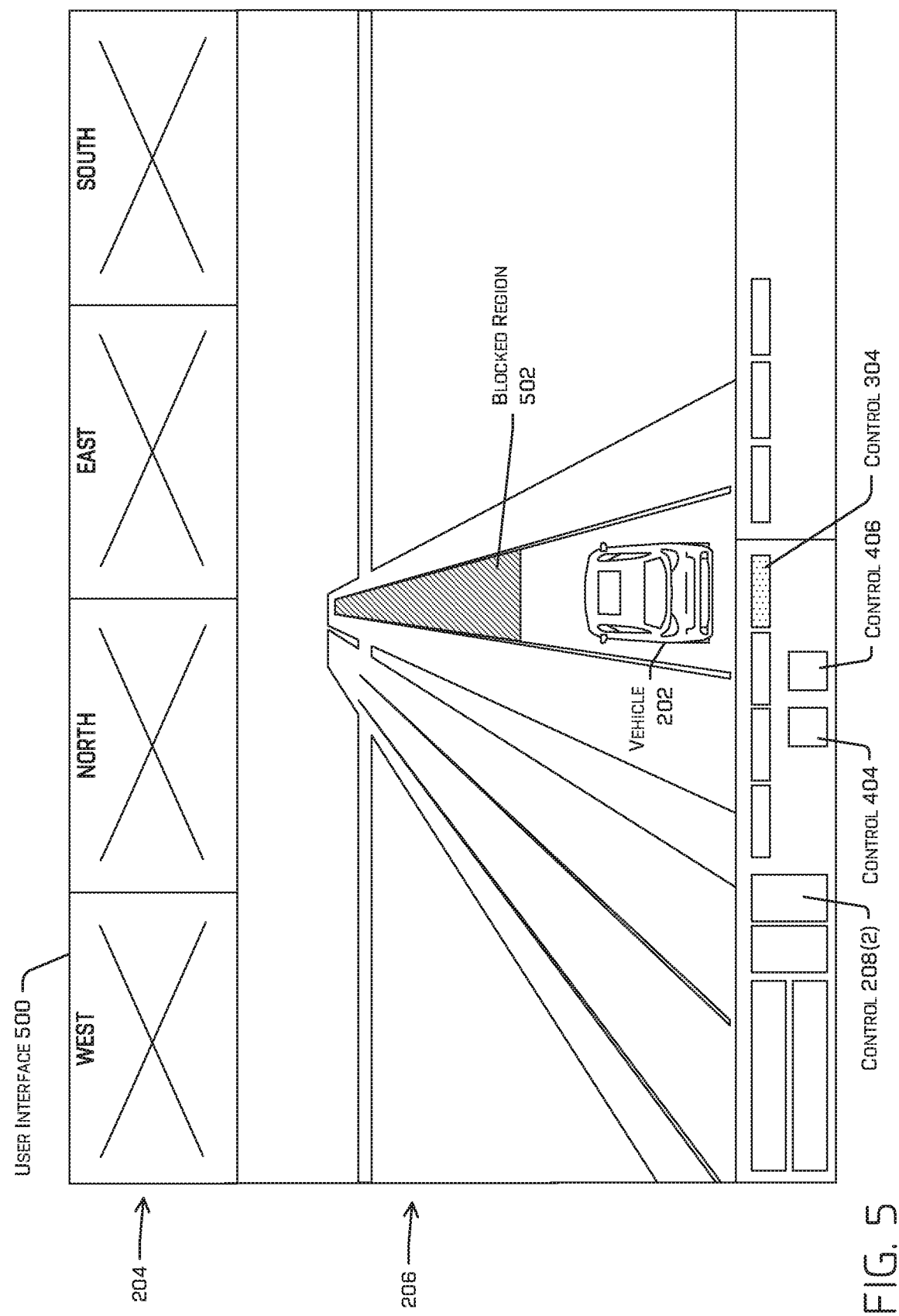
FIG. 5 is an illustration of the example user interface of FIG. 3 for implementing blocked region guidance techniques described herein.

FIG. 5 is an illustration of the example user interface 500 for implementing the blocked region guidance techniques described herein. The examples discussed in relation to FIG. 5 generally describe a blocked region responsive to selection of a suggested region to block as discussed in relation to FIG. 4 and elsewhere. The user interface 500 omits detail from the first portion and second portion of the user interface 300 shown in FIG. 3 for clarity.

As shown in FIG. 5, the user interface 500 comprises a blocked region 502 responsive to receiving a user input of the control 404 confirming the suggested region to block 402 as the blocked region 502. In some examples, the blocked region 502 changes appearance to indicate a successfully blocked lane. In this way, a remote operator can easily determine whether a region is a suggested region to block or a blocked region. In various examples, determining the blocked region 502 by the computer device may comprise adjusting a feature (e.g., a start point, an endpoint, a length, a width, and so on) of the suggested region to block 402. In some examples, a length of the blocked region 502 and/or a width of the blocked region 502 may be determined based at least in part on a speed of the vehicle. For instance, a start of the blocked region 502 may be automatically adjusted to reflect a current speed of the vehicle 202 approaching the blocked region 502. In some examples, the speed of the vehicle 202 may serve as a basis for determining a predefined distance at which to start the blocked region 502 (e.g., a blocked lane) relative to the vehicle. For this reason, the start of the blocked region 502 shown in FIG. 5 is closer to the vehicle 202 than the start of the suggested region to block 402 shown in FIG. 4. Additionally, or alternatively, a length of the blocked region 502 and/or a width of the blocked region 502 may be determined based at least in part on map feature data associated with the blocked region 502.

In some examples, a machine learned model may be implemented by a vehicle computer system and/or a computer device (e.g. of a teleoperations center) to confirm the suggested region to block 402 as the blocked region. For instance, one or more machine learned models may be used to confirm a region to block independent of a human operator. In examples when the vehicle determines a suggested region to block, the vehicle computer system of the vehicle may implement a machine learned model to confirm the suggested region to block as the blocked region.

In some examples, the blocked region 502 may apply only to a vehicle requesting assistance and/or a vehicle identified for assistance by a remote operator. In such examples, an indication of the blocked region 502 may be communicated to the vehicle which may cause the blocked region 502 to be displayed on a display device of a vehicle computer system of the vehicle. In other examples, however, the blocked region 502 may apply to a fleet of vehicles in which an indication of the blocked region 502 may be communicated to the fleet of vehicles which may cause the blocked region 502 to be displayed on respective display devices associated with each vehicle computer system of each vehicle. Additional details of actions between a teleoperations center and a fleet of vehicles are described in U.S. patent application Ser. No. 14/933,665, filed on Nov. 5, 2015, entitled "Software Application and Logic to Modify Configuration of an Autonomous Vehicle," which is incorporated herein by reference.

The indication of the blocked region 502 transmitted by the computer device to the vehicle may comprise information about the blocked region (e.g., road segment identification, lane identification, start point of blocked region, length of blocked region, and so on). In some examples, the information about the blocked region 502 may be used by one or more components (a perception component, a planning component, and the like) of a vehicle computer system to cause the vehicle to determine a trajectory that safely avoids the blocked region 502. For instance, road segment(s) and/or lane identification(s) data associated with the blocked region 502 may be processed by the vehicle computer system when planning operations for the vehicle 202.

Figure 6:
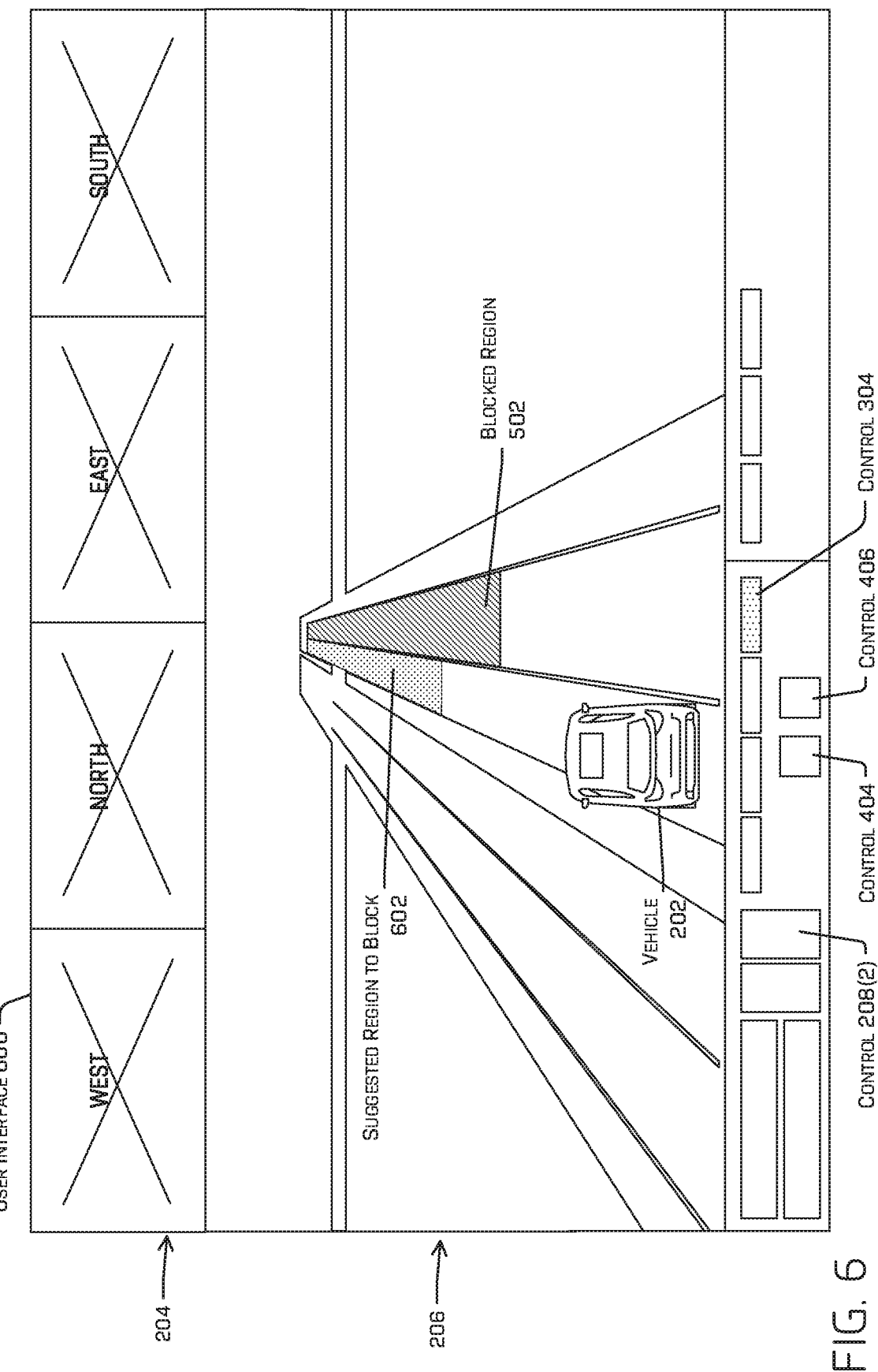
FIG. 6 is an illustration of the example user interface of FIG. 3 for implementing blocked region guidance techniques described herein.

In some examples, information about the blocked region 502 may conflict with sensor data captured by the vehicle (e.g., the sensor data shows the blocked region to be clear). In such examples, the vehicle computer system may use the indication of the blocked region in planning considerations by giving more weight to the information about the blocked region received from the computer device than to the sensor data related to the blocked region. In this way, the blocked region may take precedent in planning consideration over sensor data indicating that the blocked region is clear. FIG. 6 is an illustration of the example user interface 600 for implementing the blocked region guidance techniques described herein. The examples discussed in relation to FIG. 6 generally describe presenting a suggested region to block 602 after blocking a region as discussed in relation to FIG. 5 and elsewhere. FIG. 6 omits detail from the first portion and second portion of the user interface shown in FIG. 3 for clarity.

As shown in FIG. 6, a computer device may determine the suggested region to block 602 based at least in part on the vehicle 202 changing to an open lane. In some examples, the control 404 to indicate a request to block a region may be enabled (made available for selection) based at least in part on presenting the suggested region to block 602 and/or on the vehicle 202 changing to an open lane. In some examples, a remote operator of the user interface 600 may continue to select additional suggested region(s) to block prior to relinquishing control to the vehicle (in examples when the computer device takes control of the vehicle) and/or transmitting an indication of the blocked region(s) to the vehicle.

In some examples, a blocked region may be unblocked using the control 406 in the user interface 600 that either unblocks a specific blocked region and/or unblocks a set of blocked regions. In some instances, one or more block lanes may be unblocked individually using a control that corresponds to each blocked region (not shown) and/or by selecting the blocked region.

In various examples in which the computer device takes control of at least some operations of the vehicle, unblocking a region may occur automatically upon the computer device relinquishing control of the vehicle. When a blocked region becomes unblocked, in some examples, corresponding indication(s) of the blocked region transmitted to the vehicle (and the information associated therewith) may be removed from planning considerations determined by a vehicle computer system of the vehicle.

In some examples, a blocked region may be change to an unblocked region based at least in part on the vehicle passing the blocked region. In still further examples, changing the blocked region to an unblocked region may be based on a global map usable by a fleet of autonomous vehicles being updated to remove the blocked region. In some examples, a vehicle in the fleet may make a recommendation (e.g., send a request to the computer device) to clear a blocked region, and the teleoperator may confirm unblocking the region using a control presented in a user interface of the computer device. In yet another example, a vehicle computer system of the vehicle may clear a blocked region and communicate the change to the computer device.

Figure 7:
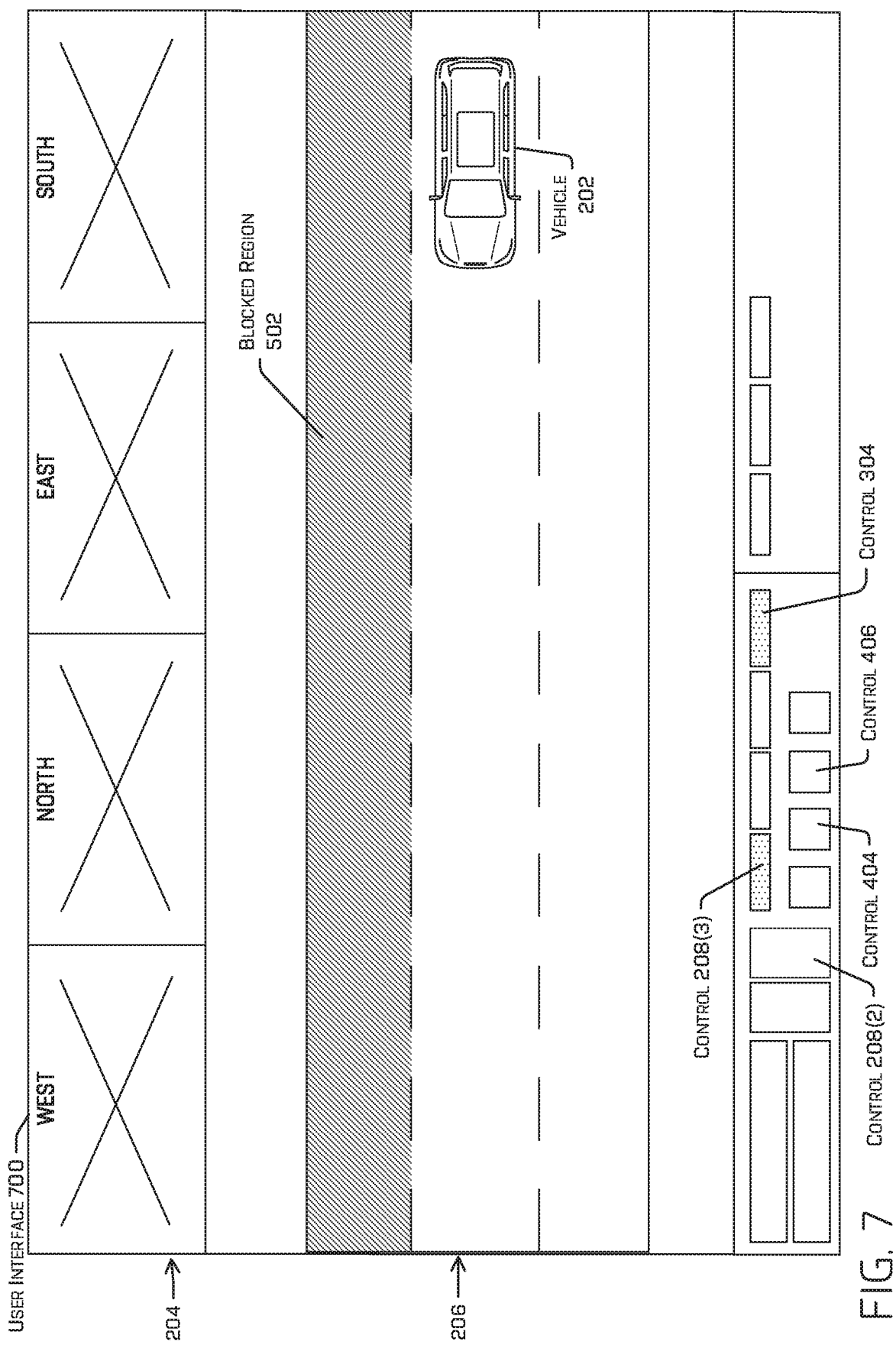
FIG. 7 is an illustration of an example user interface showing an example representation of a vehicle traversing an example environment that includes a region designated as being blocked.

FIG. 7 is an illustration of an example user interface 700 showing an example representation of a vehicle traversing an example environment that includes a region designated as being blocked (blocked region 502). The examples discussed in relation to FIG. 7 generally describe presenting controls for planning tool (control 208(3)), for controlling the vehicle (control 208(2)) and blocking one or more regions (control 404). User interface 700 omits detail from the first portion and second portion of the user interface 300 shown in FIG. 3 for clarity.

As depicted FIG. 7, the computer device presents the user interface 700 showing a top perspective of the vehicle 202 traversing an environment that includes the blocked region 502. This may represent a continuation of the example in FIG. 6 after the vehicle 202 changes lanes. In some examples, the vehicle 202 may have changed lanes under control of a remote operator and continued to navigate the vehicle 202 in the environment using the planning controls available to the user interface 700. In such examples, control 208(3) indicates vehicle planning tools are active in the user interface 700 while control 304 indicates region blocking tools are active (shown in FIG. 7 hatched). In some examples, the blocked region 502 may persist until a designated end (e.g., a change in lane identification) and/or until the blocked region is cleared (unblocked).

While described as a separate system, in some examples, the guidance techniques described herein in relation to FIGS. 1-7 may be implemented by other vehicle systems, components, and/or computer devices. For example, and as will be described in further detail regarding FIG. 8, the guidance techniques described herein in relation to FIGS. 1-7 may be implemented at least partially by or in association with a perception component, a planning component, and/or a guidance component of FIG. 8. In addition, the examples discussed in relation to FIGS. 1-7 may be based at least in part on receiving a request for assistance from a vehicle or in other examples may be based at least in part on the computer device (or a remote operator thereof) initiating assistance to the vehicle without receiving an explicit request for assistance from the vehicle.

Figure 8:
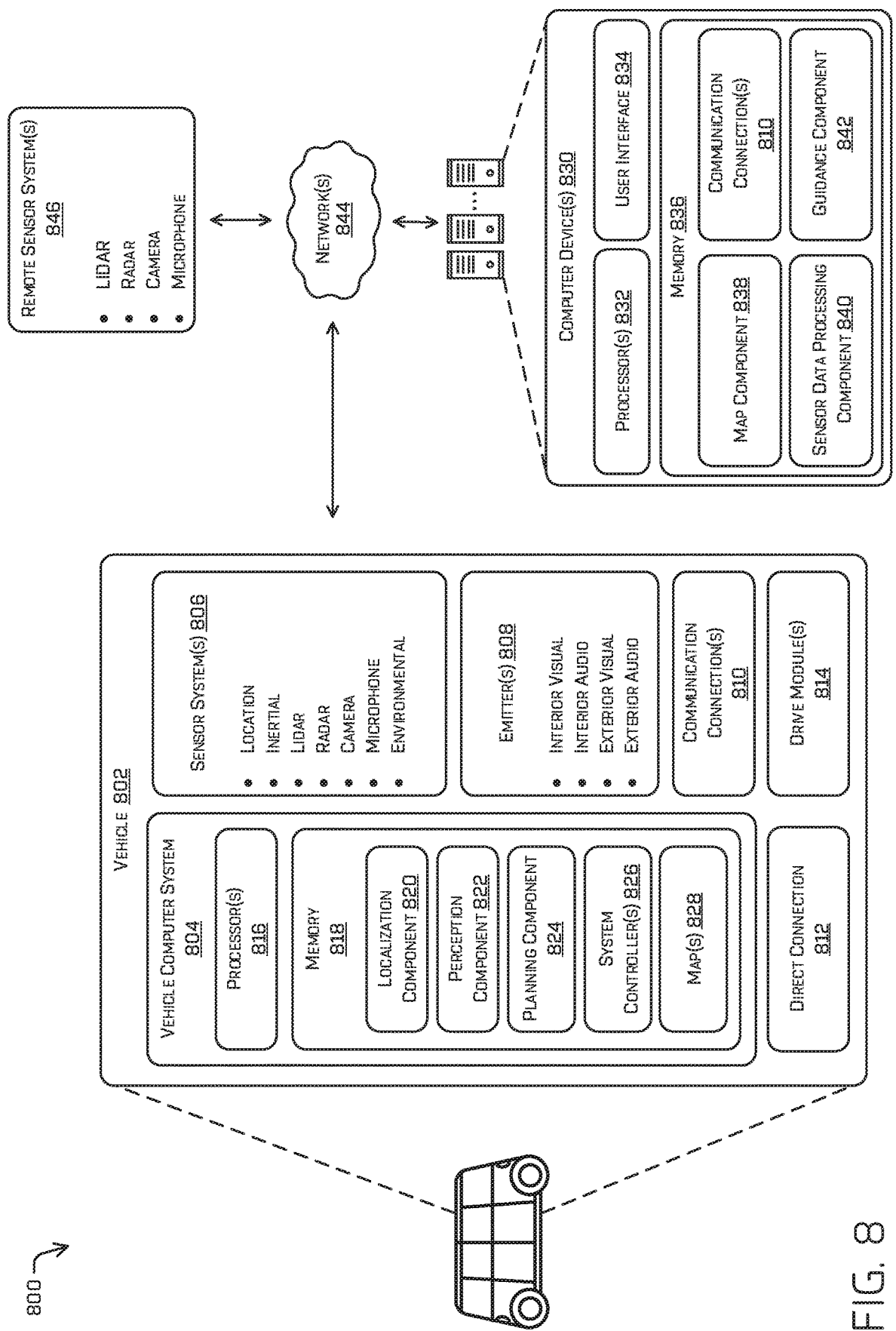
FIG. 8 is a block diagram of an example system for implementing the techniques described herein.

FIG. 8 is a block diagram of an example system 800 for implementing the techniques described herein. In at least one example, the system 800 may include a vehicle, such as vehicle 802.

The vehicle 802 may include a vehicle computer system 804, one or more sensor systems 806, one or more emitters 808, one or more communication connections 810, at least one direct connection 812, and one or more drive modules 814.

The vehicle computer system 804 may include one or more processors 816 and memory 818 communicatively coupled with the one or more processors 816. In the illustrated example, the vehicle 802 is an autonomous vehicle; however, the vehicle 802 could be any other type of vehicle, such as a semi-autonomous vehicle, or any other system having at least an image capture device (e.g., a camera enabled smartphone). In some instances, the autonomous vehicle 802 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 802 may be a fully or partially autonomous vehicle having any other level or classification.

In various examples, the vehicle computer system 804 may store sensor data associated with actual location of an object at the end of the set of estimated states (e.g., end of the period of time) and use this data as training data to train one or more models. In some examples, the vehicle computer system 804 may provide the data to a remote computer device (i.e., computer device separate from vehicle computer system such as the computer device(s) 830) for data analysis. In such examples, the computer device may analyze the sensor data to determine In the illustrated example, the memory 818 of the vehicle computer system 804 stores a localization component 820, a perception component 822, a planning component 824, one or more system controllers 826, and one or more maps 828. Though depicted in FIG. 8 as residing in the memory 818 for illustrative purposes, it is contemplated that the localization component 820, the perception component 822, the planning component 824, the one or more system controllers 826, and/or the one or more maps 828 may additionally, or alternatively, be accessible to the vehicle 802 (e.g., stored on, or otherwise accessible by, memory remote from the vehicle 802, such as, for example, on memory 836 of a computer device 830).

In at least one example, the localization component 820 may include functionality to receive data from the sensor system(s) 806 to determine a position and/or orientation of the vehicle 802 (e.g., one or more of an x-, y-, z-position, roll, pitch, or yaw). For example, the localization component 820 may include and/or request/receive a map of an environment, such as from map(s) 828 and/or map component 838 and may continuously determine a location and/or orientation of the autonomous vehicle within the map. In some instances, the localization component 820 may utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 820 may provide data to various components of the vehicle 802 to determine an initial position of an autonomous vehicle for determining the relevance of an object to the vehicle 802, as discussed herein.

In some instances, the perception component 822 may include functionality to perform object detection, segmentation, and/or classification. In some examples, the perception component 822 may provide processed sensor data that indicates a presence of an object (e.g., entity) that is proximate to the vehicle 802 and/or a classification of the object as an object type (e.g., car, pedestrian, cyclist, animal, building, tree, road surface, curb, sidewalk, unknown, etc.). In some examples, the perception component 822 may provide processed sensor data that indicates a presence of a stationary entity that is proximate to the vehicle 802 and/or a classification of the stationary entity as a type (e.g., building, tree, road surface, curb, sidewalk, unknown, etc.). In additional or alternative examples, the perception component 822 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

In general, the planning component 824 may determine a path for the vehicle 802 to follow to traverse through an environment. For example, the planning component 824 may determine various routes and trajectories and various levels of detail. For example, the planning component 824 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 824 may generate an instruction for guiding the autonomous vehicle along at least a portion of the route from the first location to the second location. In at least one example, the planning component 824 may determine how to guide the autonomous vehicle from a first waypoint in the sequence of waypoints to a second waypoint in the sequence of waypoints. In some examples, the instruction may be a trajectory, or a portion of a trajectory. In some examples, multiple trajectories may be substantially simultaneously generated (e.g., within technical tolerances) in accordance with a receding horizon technique, wherein one of the multiple trajectories is selected for the vehicle 802 to navigate.

In some examples, the planning component 824 may include a prediction component to generate predicted trajectories of objects (e.g., objects) in an environment and/or to generate predicted candidate trajectories for the vehicle 802. For example, a prediction component may generate one or more predicted trajectories for objects within a threshold distance from the vehicle 802. In some examples, a prediction component may measure a trace of an object and generate a trajectory for the object based on observed and predicted behavior.

In at least one example, the vehicle computer system 804 may include one or more system controllers 826, which may be configured to control steering, propulsion, braking, safety, emitters, communication, and other systems of the vehicle 802. The system controller(s) 826 may communicate with and/or control corresponding systems of the drive module(s) 814 and/or other components of the vehicle 802.

The memory 818 may further include one or more maps 828 that may be used by the vehicle 802 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 802 may be controlled based at least in part on the map(s) 828. That is, the map(s) 828 may be used in connection with the localization component 820, the perception component 822, and/or the planning component 824 to determine a location of the vehicle 802, detect objects and/or regions in an environment, generate routes, determine actions and/or trajectories to navigate within an environment.

In some examples, the one or more maps 828 may be stored on a remote computer device(s) (such as the computer device(s) 830) accessible via network(s) 844. In some examples, multiple maps 828 may be stored based on, for example, a characteristic (e.g., type of entity, time of day, day of week, season of the year, etc.). Storing multiple maps 828 may have similar memory requirements, but increase the speed at which data in a map may be accessed.

As illustrated in FIG. 8, the computer system 830 may include a guidance component 842. In various examples, the guidance component 842 may receive sensor data associated with the detected object(s) and/or region(s) from the perception component 822 and/or from the sensor system(s) 806. In some examples, the guidance component 842 may receive environment characteristics (e.g., environmental factors, etc.) and/or weather characteristics (e.g., weather factors such as snow, rain, ice, etc.) from the perception component 822 and/or the sensor system(s) 806. The guidance component 842 may be configured to determine a suggested region to block, such as the suggested region to block of FIG. 5. While shown separately in FIG. 8, the guidance component 842 could be part of the planning component 824 or another component(s) of the vehicle 802.

In various examples, the guidance component 842 may be configured to receive a user input confirming selection of the suggested region to block as a blocked region, such as the blocked region 502 of FIG. 5. The guidance component 842 may determine information associated with the blocked region and transmit the information to the vehicle 802 via the network 844. In various examples, the information may comprise an indication of the blocked region usable by the planning component 824 to generate one or more predicted trajectories for the vehicle 802 (e.g., direction of travel, speed, etc.). In some examples, the guidance component 842 may be configured to determine one or more available trajectories for the vehicle 802 to follow that avoids the blocked region. Additionally, or alternatively the guidance component 842 may be configured to transmit the one or more available trajectories to the vehicle 802 for the vehicle to consider in planning consideration. In some examples, the guidance component 842 may be configured to determine trajectories that are applicable to the environment, such as based on environment characteristics, weather characteristics, or the like.

The guidance component 842 may be configured to control operations of the vehicle 802 such as by receiving input from a remote operator via the user interface. For instance, the remote operator may select a control that implements a planning tool in the user interface that enables planning for the vehicle to be performed automatically by the planning tool and/or manually by a remote operator.

In some examples, the guidance component 842 may be configured to receive an input to unblock one or more blocked regions. In some examples, a blocked lane may be unblocked using a control in the user interface that either unblocks a specific blocked region and/or unblocks a set of blocked regions. In some instances, one or more block lanes may be unblocked individually using a control in the user interface that corresponds to each blocked region and/or by selecting the blocked region.

In various examples in which the computer device 830 takes control of at least some operations of the vehicle, unblocking a region may occur automatically upon the computer device relinquishing control of the vehicle. When a blocked region becomes unblocked, in some examples, corresponding indication(s) of the blocked region transmitted to the vehicle (and the information associated therewith) may be removed from planning considerations determined by the vehicle computer system.

As can be understood, the components discussed herein (e.g., the localization component 820, the perception component 822, the planning component 824, the one or more system controllers 826, the one or more maps 828, the guidance component 842 are described as divided for illustrative purposes. However, the operations performed by the various components may be combined or performed in any other component.

In some instances, aspects of some or all of the components discussed herein may include any models, techniques, and/or machine learned techniques. For example, in some instances, the components in the memory 818 (and the memory 836, discussed below) may be implemented as a neural network.

As described herein, an exemplary neural network is a biologically inspired technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet70, ResNet101, VGG, DenseNet, PointNet, and the like.

In at least one example, the sensor system(s) 806 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 806 may include multiple instances of each of these or other types of sensors. For instance, the lidar sensors may include individual lidar sensors located at the corners, front, back, sides, and/or top of the vehicle 802. As another example, the camera sensors may include multiple cameras disposed at various locations about the exterior and/or interior of the vehicle 802. The sensor system(s) 806 may provide input to the vehicle computer system 804. Additionally, or in the alternative, the sensor system(s) 806 may send sensor data, via the one or more networks 844, to the one or more computer device(s) 830 at a particular frequency, after a lapse of a predetermined period of time, in near real-time, etc.

The vehicle 802 may also include one or more emitters 808 for emitting light and/or sound. The emitters 808 may include interior audio and visual emitters to communicate with passengers of the vehicle 802. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 808 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 802 may also include one or more communication connections 810 that enable communication between the vehicle 802 and one or more other local or remote computer device(s). For instance, the communication connection(s) 810 may facilitate communication with other local computer device(s) on the vehicle 802 and/or the drive module(s) 814. Also, the communication connection(s) 810 may allow the vehicle to communicate with other nearby computer device(s) (e.g., computer device(s) 830, other nearby vehicles, etc.) and/or one or more remote sensor system(s) 846 for receiving sensor data. The communications connection(s) 810 also enable the vehicle 802 to communicate with a remote teleoperations computer device or other remote services.

The communications connection(s) 810 may include physical and/or logical interfaces for connecting the vehicle computer system 804 to another computer device or a network, such as network(s) 844. For example, the communications connection(s) 810 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computer device to interface with the other computer device(s).

In at least one example, the vehicle 802 may include one or more drive modules 814. In some examples, the vehicle 802 may have a single drive module 814. In at least one example, if the vehicle 802 has multiple drive modules 814, individual drive modules 814 may be positioned on opposite ends of the vehicle 802 (e.g., the front and the rear, etc.). In at least one example, the drive module(s) 814 may include one or more sensor systems to detect conditions of the drive module(s) 814 and/or the surroundings of the vehicle 802. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive module(s) 814. In some cases, the sensor system(s) on the drive module(s) 814 may overlap or supplement corresponding systems of the vehicle 802 (e.g., sensor system(s) 806).

The drive module(s) 814 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 814 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive module(s) 814. Furthermore, the drive module(s) 814 may also include one or more communication connection(s) that enable communication by the respective drive module with one or more other local or remote computer device(s).

In at least one example, the direct connection 812 may provide a physical interface to couple the one or more drive module(s) 814 with the body of the vehicle 802. For example, the direct connection 812 may allow the transfer of energy, fluids, air, data, etc. between the drive module(s) 814 and the vehicle. In some instances, the direct connection 812 may further releasably secure the drive module(s) 814 to the body of the vehicle 802.

In at least one example, the localization component 820, the perception component 822, the planning component 824, the one or more system controllers 826, and the one or more maps 828, may process sensor data, as described above, and may send their respective outputs, over the one or more network(s) 844, to the computer device(s) 830. In at least one example, the localization component 820, the perception component 822, the planning component 824, and the one or more system controllers 826, the one or more maps 828, may send their respective outputs to the computer device(s) 830 at a particular frequency, after a lapse of a predetermined period of time, in near real-time, etc.

In some examples, the vehicle 802 may send sensor data to the computer device(s) 830 via the network(s) 844. In some examples, the vehicle 802 may receive sensor data from the computer device(s) 830 and/or remote sensor system(s) 846 via the network(s) 844. The sensor data may include raw sensor data and/or processed sensor data and/or representations of sensor data. In some examples, the sensor data (raw or processed) may be sent and/or received as one or more log files.

The computer device(s) 830 may include processor(s) 832, a user interface 834, and a memory 836 storing the map component 838, a sensor data processing component 840, and a guidance component 842. In some examples, the map component 838 may include functionality to generate maps of various resolutions. In such examples, the map component 838 may send one or more maps to the vehicle computer system 804 for navigational purposes. In various examples, the sensor data processing component 840 may be configured to receive data from one or more remote sensors, such as sensor system(s) 806 and/or remote sensor system(s) 846. In some examples, the sensor data processing component 840 may be configured to process the data and send processed sensor data to the vehicle computer system 804, such as for use by the planning component 824. In some examples, the sensor data processing component 840 may be configured to send raw sensor data to the vehicle computer system 804.

The processor(s) 816 of the vehicle 802 and the processor(s) 832 of the computer device(s) 830 may be any suitable processor capable of executing instructions to process data and perform operations as described herein. By way of example and not limitation, the processor(s) 816 and 832 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 818 and memory 836 are examples of non-transitory computer-readable media. The memory 818 and memory 836 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 818 and memory 836 may include at least a working memory and a storage memory. For example, the working memory may be a high-speed memory of limited capacity (e.g., cache memory) that is used for storing data to be operated on by the processor(s) 816 and 832. In some instances, the memory 818 and memory 836 may include a storage memory that may be a lower-speed memory of relatively large capacity that is used for long-term storage of data. In some cases, the processor(s) 816 and 832 cannot operate directly on data that is stored in the storage memory, and data may need to be loaded into a working memory for performing operations based on the data, as discussed herein.

It should be noted that while FIG. 8 is illustrated as a distributed system, in alternative examples, components of the vehicle 802 may be associated with the computer device(s) 830 and/or components of the computer device(s) 830 may be associated with the vehicle 802. That is, the vehicle 802 may perform one or more of the functions associated with the computer device(s) 830, and vice versa.

Figure 9:
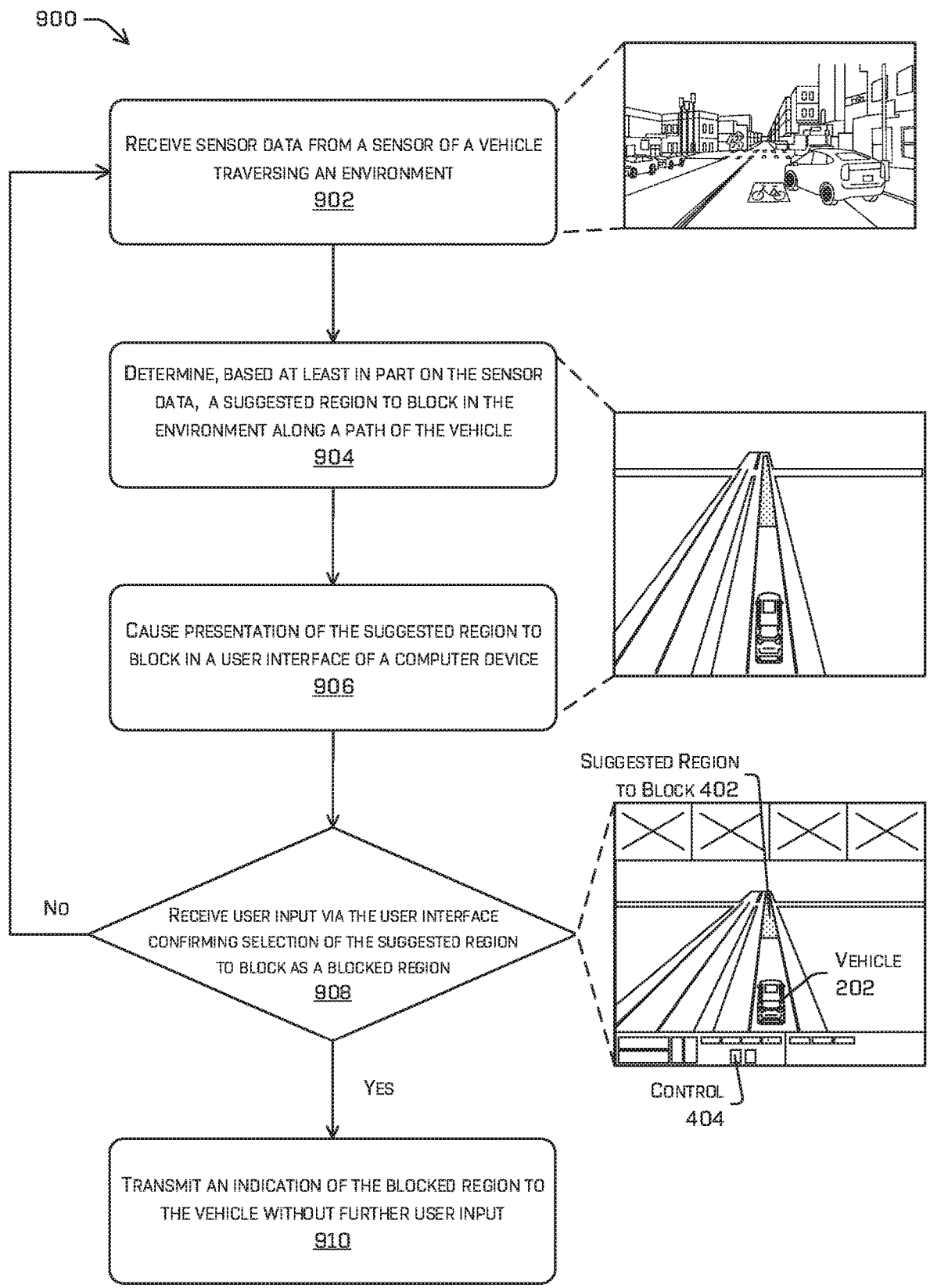
FIG. 9 is a flowchart depicting an example process for designating a region of an example environment as being blocked.

FIG. 9 illustrates an example processes in accordance with embodiments of the disclosure. These processes are illustrated as logical flow graphs, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes.

FIG. 9 is a flowchart depicting an example process 900 for designating a region of an example environment as being blocked. Some or all of the process 900 may be performed by one or more components in FIG. 8, as described herein. For example, some or all of process 900 may be performed by the computer system 830.

At operation 902, the process may include receiving sensor data from a sensor of a vehicle. For instance, a computer system of a teleoperations center may be configured to receive sensor data representing a vehicle relative to one or more objects in an environment. The sensor data may be received from one or more sensors on the vehicle and/or from one or more remote sensors. In some examples, a vehicle computer system of the vehicle may be configured to detect dynamic objects, static objects, and/or regions. In some examples, the sensor data may be combined with map data representing fixed features of an environment including but not limited to crosswalks, traffic signals, school zones, bicycle lanes, and the like. In various examples, the objects may be detected utilizing machine learned techniques. In such examples, one or more machine learned algorithms may be trained to detect objects based on sensor data.

At operation 904, the process may include determining, based at least in part on the sensor data, a suggested region to block in an environment along a path of the vehicle. For instance, a computer device may determine the suggested region to block 402 based at least in part on the sensor data and the map data. For example, the computer device 830 may determine a size of the suggested region to block 402 and/or a shape of the suggested region to block 402 for presentation based at least on a map storing features that represent the environment. In various examples, the suggested region to block may be determined based at least in part on a region associated with a road segment (road segment 214), a blocked lane in a roadway, a construction zone in the roadway, and/or a region beyond vehicle line-of-sight (e.g., due to a horizon). For instance, the computer system may determine that the suggested region to block 402 represents a lane of a roadway, multiple lanes of the roadway, a portion of a lane of a roadway etc. In various examples, the vehicle may communicate the suggested regions to block 502 to the computer device for processing by the computer device and/or presentation on a user interface.

At operation 906, the process may include causing presentation of the suggested region to block in a user interface of a computer device. For instance, a computer device 830 may, in various examples, determine the suggested region to block 402 and present the suggested region to block 402 in the user interface 400. In various examples, the computer device 830 may present the suggested region to block 402 in the user interface 400 based at least in part on receiving a request for assistance from the vehicle. In various examples, the computer device 830 may receive a user input vie the user interface to adjust features (a start point, an endpoint, a length, a width, and so on) of the suggested region to block.

At operation 908, the process may include receiving a user input via the user interface confirming selection of the suggested region to block as a blocked region. In various examples, the user interface 400 may receive a user input of a control (control 404) to confirm the suggested region to block 402 as the blocked region 502. In examples when no user input is received (indicated by "No"), then the process may include receiving additional sensor data from the vehicle. In such examples, new sensor data may cause a presentation of another suggested region to block. In some examples, a teleoperator may amend the suggested region to block 402 and/or the blocked region 502. For instance, the computer device may receive a user input via a user interface to adjust at least one of a size of the suggested region 402, a shape of the suggested region 402, a size of the blocked region 502, or a shape of the blocked region 502.

In examples when a user input is received (indicated by "Yes"), then the process may include, at operation 910, transmitting an indication of the blocked region to the vehicle without further user input. In various examples, the computer device 830 may transmit information about the blocked region 502 to the vehicle (and in some examples additional vehicles that may also be affected by the blocked region 502) based at least in part on a user input being received at the control 404 of user interface 400. The information (e.g., road segment identification, lane identification, start point of blocked region, length of blocked region, and so on) may be processed by a vehicle computer system to navigate the vehicle past the blocked region.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some embodiments, one or more operations of the method may be omitted entirely. By way of example and not limitation, operations 604 and 608 may be performed without operations 610, 612, and/or 614. Moreover, the methods described herein can be combined in whole or in part with each other or with other methods.

The various techniques described herein may be implemented in the context of computer-executable instructions or software, such as program modules, that are stored in computer-readable storage and executed by the processor(s) of one or more computer devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

EXAMPLE CLAUSES

Any of the example clauses in this section may be used with any other of the example clauses and/or any of the other examples or embodiments described herein.

A: A system comprising: one or more processors; and non-transitory computer-readable storage media storing instructions that, when executed by the one or more processors, cause the system to perform operations comprising: receiving sensor data from a sensor associated with a vehicle traversing an environment; determining, based at least in part on the sensor data, a suggested region to block in the environment along a path of the vehicle; causing presentation of the suggested region to block in a user interface; receiving, by the user interface, user input confirming selection of the suggested region to block as a blocked region; and transmitting an indication of the blocked region to the vehicle.

B: A system as paragraph A describes, wherein the suggested region to block comprises a lane of a roadway in the environment.

C: A system as paragraphs A or B describe, wherein determining the suggested region to block in the environment is further based at least in part on a map storing features of the environment.

D: A system as paragraphs A-C describe, wherein the vehicle is an individual vehicle of a fleet of vehicles and the operations further comprising transmitting the indication of the blocked region to an additional vehicle of the fleet of vehicles.

E: A system as paragraphs A-D describe, the operations further comprising receiving, by the user interface, an indication that the vehicle can drive in a region previously designated, based at least in part on map data, as non-drivable.

F: A method comprising: receiving sensor data from a sensor associated with a vehicle traversing an environment; determining, based at least in part on the sensor data, a suggested region of the environment in which the vehicle is precluded from travelling; causing presentation of the suggested region in a user interface; and receiving user input confirming selection of the suggested region to block as a blocked region; and transmitting an indication of the blocked region.

G: A method as paragraph F describes, wherein the suggested region to block comprises a lane of a roadway in the environment.

H: A method as paragraphs F or G describe, further comprising storing the blocked region in a map.

I: A method as paragraphs F-H describe, further comprising receiving user input via the user interface confirming selection to unblock the blocked region.

J: A method as paragraphs F-I describe, further comprising receiving a request from the vehicle to unblock the blocked region and wherein receiving user input via the user interface confirming selection to unblock the blocked region is based at least in part on the request.

K: A method as paragraphs F-J describe, further comprising receiving user input via the user interface to adjust at least one of a size of the suggested region or a shape of the suggested region.

L: A method as paragraphs F-K describe, wherein transmitting the indication of the blocked region comprises transmitting the indication of the blocked region to another vehicle of a fleet of vehicles.

M: A method as paragraphs F-L describe, wherein the suggested region is based at least in part on map data.

N: A method as paragraphs F-M describe, further comprising causing the vehicle to navigate the environment based at least in part on the indication of the blocked region.

O: A non-transitory computer-readable storage media storing instructions that, when executed, cause one or more processors to perform operations comprising: receiving sensor data from a sensor associated with a vehicle traversing an environment; determining, based at least in part on the sensor data, a suggested region of the environment in which the vehicle is precluded from travelling; causing presentation of the suggested region in a user interface; and receiving user input confirming selection of the suggested region to block as a blocked region; and transmitting an indication of the blocked region.

P: A non-transitory computer-readable storage media as paragraph O describes, wherein the suggested region to block comprises a lane of a roadway in the environment.

Q: A non-transitory computer-readable storage media as paragraphs O or P describe, wherein determining the suggested region to block in the environment is further based at least in part on a map storing features of the environment.

R: A non-transitory computer-readable storage media as paragraphs O-Q describe, wherein the vehicle is an individual vehicle of a fleet of vehicles and the operations further comprising transmitting the indication of the blocked region to an additional vehicle of the fleet of vehicles.

S: A non-transitory computer-readable storage media as paragraphs O-R describe, the operations further comprising receiving, by the user interface, an indication that the vehicle can drive in a region previously designated, based at least in part on map data, as non-drivable.

T: A non-transitory computer-readable storage media as paragraphs O-Q describe, wherein transmitting the indication of the blocked region comprises transmitting the indication of the blocked region to another vehicle of a fleet of vehicles.

While the example clauses described above are described with respect to one particular implementation, it should be understood that, in the context of this document, the content of the example clauses may also be implemented via a method, device, system, a computer-readable medium, and/or another implementation.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
   one or more processors; and
   non-transitory computer-readable storage media storing instructions that, when executed by the one or more processors, cause the system to perform operations comprising:
      receiving sensor data from a sensor associated with a vehicle traversing an environment;
      determining, based at least in part on the sensor data, a suggested region to block in the environment along a path of the vehicle;
      causing presentation of the suggested region to block in a user interface of a computing device remote from the vehicle;
      receiving, by the user interface, user input confirming selection of the suggested region to block as a blocked region; and
      transmitting an indication of the blocked region to the vehicle for use by a vehicle computing system to guide the vehicle past the blocked region.

2. The system of claim 1,
   wherein the suggested region to block comprises a lane of a roadway in the environment.

3. The system of claim 1, wherein determining the suggested region to block in the environment is further based at least in part on a map storing features of the environment.

4. The system of claim 1, wherein the vehicle is an individual vehicle of a fleet of vehicles and the operations further comprising transmitting the indication of the blocked region to an additional vehicle of the fleet of vehicles.

5. The system of claim 1, the operations further comprising receiving, by the user interface, an indication that the vehicle can drive in a region previously designated, based at least in part on map data, as non-drivable.

6. A method comprising:
receiving sensor data from a sensor associated with a vehicle traversing an environment;
determining, based at least in part on the sensor data, a suggested region of the environment in which the vehicle is precluded from travelling;
causing presentation of the suggested region in a user interface of a computing device remote from the vehicle;
receiving, by the user interface, user input confirming selection of the suggested region to block as a blocked region; and
transmitting an indication of the blocked region.

7. The method of claim 6, wherein the suggested region to block comprises a lane of a roadway in the environment.

8. The method of claim 6, further comprising storing the blocked region in a map.

9. The method of claim 6, further comprising receiving user input via the user interface confirming selection to unblock the blocked region.

10. The method of claim 9, further comprising receiving a request from the vehicle to unblock the blocked region and wherein receiving user input via the user interface confirming selection to unblock the blocked region is based at least in part on the request.

11. The method of claim 6, further comprising receiving user input via the user interface to adjust at least one of a size of the suggested region or a shape of the suggested region.

12. The method of claim 6, wherein transmitting the indication of the blocked region comprises transmitting the indication of the blocked region to another vehicle of a fleet of vehicles.

13. The method of claim 6, wherein the suggested region is based at least in part on map data.

14. The method of claim 6, further comprising causing the vehicle to navigate the environment based at least in part on the indication of the blocked region.

15. A non-transitory computer-readable storage media storing instructions that, when executed, cause one or more processors to perform operations comprising:
receiving sensor data from a sensor associated with a vehicle traversing an environment;
determining, based at least in part on the sensor data, a suggested region of the environment in which the vehicle is precluded from travelling;
causing presentation of the suggested region in a user interface of a computing device remote from the vehicle;
receiving, by the user interface, user input confirming selection of the suggested region to block as a blocked region; and
transmitting an indication of the blocked region.

16. The non-transitory computer-readable storage media of claim 15, wherein the suggested region to block comprises a lane of a roadway in the environment.

17. The non-transitory computer-readable storage media of claim 15, wherein determining the suggested region to block in the environment is further based at least in part on a map storing features of the environment.

18. The non-transitory computer-readable storage media of claim 15, wherein the vehicle is an individual vehicle of a fleet of vehicles and the operations further comprising transmitting the indication of the blocked region to an additional vehicle of the fleet of vehicles.

19. The non-transitory computer-readable storage media of claim 15, the operations further comprising receiving, by the user interface, an indication that the vehicle can drive in a region previously designated, based at least in part on map data, as non-drivable.

20. The non-transitory computer-readable storage media of claim 15, wherein transmitting the indication of the blocked region comprises transmitting the indication of the blocked region to another vehicle of a fleet of vehicles.

* * * * *